March 6, 1928.  1,661,561
C. A. CLAFLIN
OILING MECHANISM FOR AIR ACTUATED DEVICES
Filed May 5, 1926
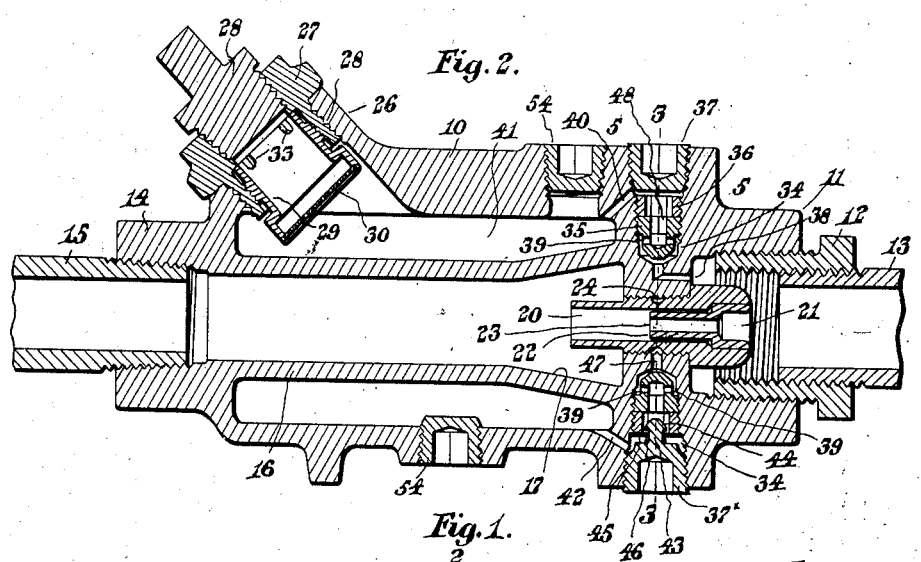
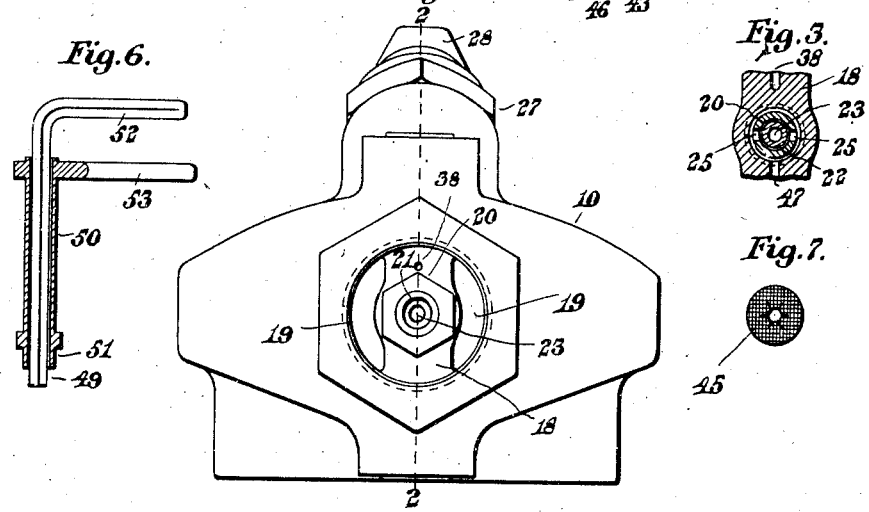
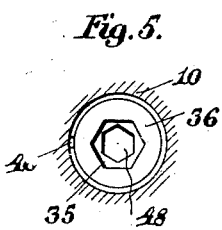
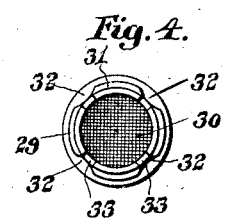
Inventor:
Charles A. Claflin,
by Walter E. Lombard
Atty.

Patented Mar. 6, 1928.

1,661,561

UNITED STATES PATENT OFFICE.

CHARLES A. CLAFLIN, OF MEDFORD, MASSACHUSETTS.

OILING MECHANISM FOR AIR-ACTUATED DEVICES.

Application filed May 5, 1926. Serial No. 106,836.

This invention relates to oiling mechanism and has for its particular object the production of a device of this character for use in connection with air actuated tools in which the oil will be atomized and carried by the air under pressure into the tool in the form of a fine spray.

This object is attained by the mechanism shown in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawing:

Figure 1 represents an end elevation of a device embodying the principles of the present invention.

Figure 2 represents a longitudinal vertical section of the same on line 2, 2, on Fig. 1.

Figure 3 represents a vertical transverse section of a portion of the same on line 3, 3, on Fig. 2.

Figure 4 represents a plan of the strainer.

Figure 5 represents a horizontal section of a portion of the device on line 5, 5, on Fig. 2, drawn to an enlarged scale.

Figure 6 represents a vertical section of the tool used to adjust the valve members and lock nuts therefor, and Figure 7 represents a plan of the small strainer, cooperating with the lower valve member.

Similar characters indicate like parts throughout the several figures of the drawings.

In the drawings, 10 is a casing having at one end a hub 11 into which is threaded a bushing 12, into the interior of which is threaded one end of an inlet pipe 13.

The opposite end of the casing 10 has a hub 14 into which is threaded an outlet pipe 15.

The pipes 13 and 15 are in alinement and in the interior of the casing is formed a tubular member 16, also in alinement with said pipes 13 and 15.

One end of this tubular member 16 is cone-shaped as indicated at 17, and has extending diametrically across its larger end, a bar 18, leaving on opposite sides thereof passages 19 through which air under pressure passing through the inlet pipe 13 may enter the tubular member 16.

This bar 18 has extending therethrough in axial alinement with the tubular member 16, a nozzle 20.

This nozzle 20 has disposed in its inlet end a bushing 21 having a tubular extension 22 extending therefrom with a small passage 23 extending from end to end thereof.

The periphery of this tubular extension 22 is separated from the inner cylindrical wall of the nozzle 20 leaving an annular space around the periphery of said extension.

The nozzle 20 has an annular peripheral groove 24 formed therein from which extend passages 25 to the space between the inner cylindrical wall of said nozzle 20 and the periphery of the tubular extension 22.

On the upper side of the casing 10 is a boss 26 into which is threaded a bushing 27 closed by means of a plug 28.

This bushing 27 has a female thread 28 into which is screwed receptacle 29, the lower end of which has mounted therein a perforated plate or screen 30.

The threads 31 formed upon the periphery of the receptacle 29 are cut away at various points as indicated at 32 in Fig. 4.

These cut away portions 32 provide a means for the passage of air towards the plugged end of the bushing 27, this air passing into the receptacle 29 through the notches 33 in the upper end thereof.

Extending into the opposite ends of the cross bar 18 are threaded sockets 34 in each of which is mounted a valve member 35 adjustable endwise in said socket and retained in adjusted position by means of a lock nut 36.

The outer ends of the sockets 34 are closed respectively by means of the plugs 37 and 37ˣ.

The upper socket 34 has extending from its inner end a passage 38, the entrance to which is at one side of the nozzle 20 and opposite the inlet pipe 13.

A portion of air under pressure admitted to the casing through the pipe 13 will pass through this passage 38 into the socket 34 and then through lateral ports 39 into the interior of the valve 35, upwardly through the lock nut 36, and then through a passage 40 into the chamber 41 surrounding the tubular member 16.

From the bottom of this chamber 41 extends the passage 42 into the lower socket 34 at a point above the inner end of the closing plug 38. This plug 38 has a stem 43 extending inwardly into the interior of the annular lock nut 36.

This stem has a head 44 on its inner end and around the stem 43 is a disk screen 45 of finer mesh than the screen 30, said screen 45 being normally pressed against the outer end of the annular lock nut 36 by means of a spring 46, all as shown in Fig. 2.

Between the inner end of the lower socket 34 and the annular passage 24 is a communicating passage 47.

Each valve member 35 is provided with a central pocket 48 having flat sided walls into which may be fitted one end of an actuating member 49, as shown in Fig. 6.

This actuating member 49 is revoluble in a tubular member 50, the lower end 51 of which is flat sided to fit the interior walls of the lock nut 36.

The member 49 is provided with a lateral handle 52 and the tubular member 50 is similarly provided with a lateral handle 53.

When it is desired to properly adjust the valve members 35, the ends of these two actuating members 49 and 51 are inserted respectively into the valves 35 and lock nuts 36 and then the operator holding the handle 53 rotates the handle 52 until the valve has been properly adjusted. When this has been accomplished he holds steady the handle 52 and rotates the handle 53 until the lock nut 36 is moved into contact with the valve member 35.

The threaded plugs 54 close openings oppositely disposed in the wall of the casing 10 and by removing these plugs the entire interior of the casing may be flushed out.

The oil to be used as a lubricant is placed in the receptacle 29 and the sediment therein is removed therefrom as it passes through the screen 30.

This screened oil passes to the bottom of the chamber 41 and may then pass through the small passage 42 into the lower socket 34.

The air under pressure which enters the passage 38 will pass through the ports 39, and passage 40, entering the chamber 41 where it will tend to force the oil in the bottom of said chamber through its only outlet, the passage 42.

As the main portion of the air under pressure passes through the tubular member 16 a suction will be created and that portion of the air passing through the nozzle 20 and the small passage 23 will tend to form a vacuum, thereby assisting in the upward movement of the oil through the passages 34, ports 39, and radial passages 47 into the interior of the nozzle 20.

As the oil passes from the passage 42 to the radial passage 47 it must pass through the fine mesh screen 45 where any sediment remaining in the oil may be removed therefrom.

The plug 37* with the screen 45 thereon may be removed readily so that the screen may be cleansed when necessary.

The valve members 35 may be adjusted toward and from the passages 38 and 47 so as to regulate the amount of air or oil passing through these passages.

By means of the mechanism herein shown the oil will be thoroughly atomized and mixed in the form of a fine spray with the air as it passes through the outlet pipe 15 to the tool to be actuated by the compressed air.

As this air is thoroughly impregnated with oil as it passes to the tool it is self-evident that the working parts of the tool will be thoroughly lubricated by this oil and kept in serviceable condition.

As the oil outlet is located in the right hand lower corner it is obvious that the oil will flow freely therethrough either when the device is resting on its base as shown or when on end and extending upwardly from the inlet pipe 13.

When the oil in a very fine spray is discharged from the nozzle 20 the interior of the air tube 16 becomes a mixing chamber, the air becoming thoroughly impregnated with the atoms of oil.

The peripheral cut away portions 32 of the oil receptacle 29 form vent passages through which the air in the oil chamber 41 may escape when a new supply of oil is being admitted to said chamber 41 through the receptacle 29.

It is believed that the operation and many advantages of the invention will be understood without further description.

Having thus described my invention, I claim—

1. The combination of a casing open at opposite ends and provided with an air tube extending lengthwise thereof from a point near its inlet end to its delivery end and surrounded by an oil chamber; a short nozzle centrally disposed in the inlet end of said tube having a relatively small bore extending from end to end thereof through which air may be discharged into said tube; and radial passages in said nozzle for admitting oil from said chamber into the bore of said nozzle.

2. The combination of a casing open at opposite ends and provided with an air tube extending lengthwise thereof from a point near its inlet end to its delivery end and surrounded by an oil chamber; a short nozzle centrally disposed in the inlet end of said tube having a relatively small bore extending from end to end thereof through which air may be discharged into said tube; radial passages in said nozzle for admitting oil from said chamber into the bore of said nozzle; and means for regulating the flow of oil to the radial passages of said nozzle.

3. The combination of a casing open at opposite ends and provided with an air tube extending lengthwise thereof from a point near its inlet end to its delivery end and surrounded by an oil chamber; a short nozzle centrally disposed in the inlet end of said tube having a relatively small bore extending from end to end thereof through which air may be discharged into said tube; radial passages in said nozzle for admitting oil from said chamber into the bore of said nozzle; and means for screening the oil during its passage to said nozzle from said oil chamber.

4. The combination of a casing open at opposite ends and provided with an air tube extending lengthwise thereof from a point near its inlet end to its delivery end and surrounded by an oil chamber; a short nozzle centrally disposed in the inlet end of said tube having a relatively small bore extending from end to end thereof through which air may be discharged into said tube; radial passages in said nozzle for admitting oil from said chamber into the bore of said nozzle; and means for admitting air under pressure into the top of said oil chamber from the inlet end of said casing.

5. The combination of a casing open at opposite ends and provided with an air tube extending lengthwise thereof from a point near its inlet end to its delivery end and surrounded by an oil chamber; a short nozzle centrally disposed in the inlet end of said tube having a relatively small bore extending from end to end thereof through which air may be discharged into said tube; radial passages in said nozzle for admitting oil from said chamber into the bore of said nozzle; and means adjacent said nozzle and perpendicular to the bore thereof for admitting air under pressure into the top of said oil chamber from the inlet end of said casing and regulating the passage of said air.

6. The combination of a casing open at opposite ends and provided with an air tube extending lengthwise thereof from a point near its inlet end to its delivery end and surrounded by an oil chamber, a nozzle centrally disposed in the inlet end of said tube; means for admitting oil from said chamber into said nozzle; a bushing disposed in a filling opening for said oil chamber at the top of said casing and provided with a female thread; a receptacle having a male thread coacting with said female thread and provided with a screen at its lower end; and a closure for the upper end of said bushing.

7. The combination of a casing open at opposite ends and provided with an air tube extending lengthwise thereof from a point near its inlet end to its delivery end and surrounded by an oil chamber; a nozzle centrally disposed in the inlet end of said tube; means for admitting oil from said chamber into said nozzle; a bushing disposed in a filling opening for said oil chamber at the top of said casing and provided with a female thread; a receptacle having a male thread coacting with said female thread and provided with a screen at its lower end, portions of the male thread being cut away to form air passages communicating with notches in the upper end of said receptacle; and a closure for the upper end of said bushing.

8. The combination of a casing open at both ends and provided with an air tube extending lengthwise thereof and surrounded by an oil chamber; a nozzle in the inlet end of said tube having an annular peripheral groove and radial ports therefrom communicating with the interior of the nozzle midway of its length; and means for admitting oil from said chamber into said groove.

9. The combination of a casing open at both ends and provided with an air tube extending lengthwise thereof and surrounded by an oil chamber; a nozzle in the inlet end of said tube having an annular peripheral groove and radial ports therefrom to the interior of the nozzle; means for admitting oil from said chamber into said groove; and a bushing in said nozzle having a tubular extension spaced from the inner wall of the nozzle and projecting beyond said radial ports.

10. The combination of a casing open at both ends and provided with an air tube extending lengthwise thereof and surrounded by an oil chamber, said tube having a vertical bar extending across the inlet end thereof and said casing having oppositely disposed threaded sockets extending toward the opposite ends of said bar; an air passage extending from the outer face of said bar to the inner end of the upper socket; a nozzle extending through said bar into said air tube and having radial ports communicating with an annular peripheral groove therein; means for admitting oil from said chamber into the lower socket; an oil passage leading from said groove to the inner end of the lower socket; and adjustable valve members in said sockets controlling the flow of air and oil through said passages.

11. The combination of a casing open at both ends and provided with an air tube extending lengthwise thereof and surrounded by an oil chamber, said tube having a vertical bar extending across the inlet end thereof and said casing having oppositely disposed threaded sockets extending toward the opposite ends of said bar; an air passage extending from the outer face of said bar to the inner end of the upper socket; a nozzle extending through said bar into said air tube and having radial ports communicating with an annular peripheral groove therein; means for admitting oil from said chamber into the lower socket; an oil passage leading from said groove to the inner end of the lower socket; and adjustable valve members in said sockets controlling the flow of air and oil through said passages, said valve members having recesses in their outer ends with ports radiating therefrom.

12. The combination of a casing open at both ends and provided with an air tube extending lengthwise thereof and surrounded by an oil chamber, said tube having a vertical bar extending across the inlet end thereof and said casing having oppositely disposed threaded sockets extending toward the opposite ends of said bar; an air passage extending from the outer face of said bar to the inner end of the upper socket; a nozzle extending through said bar into said air tube and having radial ports communicating with an annular peripheral groove therein; means for admitting oil from said chamber into the lower socket; an oil passage leading from said groove to the inner end of the lower socket; adjustable valve members in said sockets controlling the flow of air and oil through said passages, said valve members having flat-sided recesses in their outer ends with ports radiating therefrom; and lock nuts for said valves having flat-sided openings extending therethrough.

13. The combination of a casing open at both ends and provided with an air tube extending lengthwise thereof and surrounded by an oil chamber; said tube having a vertical bar extending across the inlet end thereof and said casing having oppositely disposed threaded sockets extending toward the opposite ends of said bar; an air passage extending from the outer face of said bar to the inner end of the upper socket; a nozzle extending through said bar into said said air tube and having radial ports communicating with an annular peripheral groove therein; means for admitting oil from said chamber into the lower socket; an oil passage leading from said groove to the inner end of the lower socket; adjustable valve members in said sockets controlling the flow of air and oil through said passages; and a closing plug in the lower socket supporting a screen above the oil inlet to said socket.

14. The combination of a casing open at both ends and provided with an air tube extending lengthwise thereof and surrounded by an oil chamber, said tube having a vertical bar extending across the inlet end thereof and said casing having oppositely disposed threaded sockets extending toward the opposite ends of said bar; an air passage extending from the outer face of said bar to the inner end of the upper socket; a nozzle extending through said bar into said air tube and having radial ports communicating with an annular peripheral groove therein; means for admitting oil from said chamber into the lower socket; an oil passage leading from said groove to the inner end of the lower socket; adjustable valve members in said sockets controlling the flow of air and oil through said passages; a closing plug in the lower socket having a headed stem; a screen surrounding the stem above the oil inlet to said socket; and a spring between said screen and the body of said plug.

15. The combination of a casing open at opposite ends and provided with an air tube extending lengthwise thereof from a point near its inlet end to its delivery end and surrounded by an oil chamber; a nozzle centrally disposed in the inlet end of said tube with its discharge end distantly removed from the discharge end of said tube; and means for admitting oil from said chamber through the walls of said nozzle into the interior thereof.

16. The combination of a casing open at opposite ends and provided with an air tube extending lengthwise thereof from a point near its inlet end to its delivery end and surrounded by an oil chamber; a short nozzle centrally disposed in the inlet end of said tube and having a passage through which air may be discharged into said tube with its discharge end distantly removed from the discharge end of said tube; means for admitting oil from said chamber through the walls of said nozzle into the interior thereof; and means for admitting air under pressure from the inlet end of said tube to the top of said oil chamber.

17. The combination of a casing open at opposite ends and provided with an air tube extending lengthwise thereof from a point near its inlet end to its delivery end and surrounded by an oil chamber; a short nozzle centrally disposed in the inlet end of said tube and having a passage through which air may be discharged into said tube; with its discharge end distantly removed from the discharge end of said tube; means for admitting oil from said chamber through the walls of said nozzle into the interior thereof at points midway of the length thereof, the discharge end of the nozzle being distantly removed from the discharge end of the tube; and means for screening the oil admitted to said chamber and again screening it in its passage from said chamber to said nozzle.

18. The combination of a casing open at opposite ends and provided with an air tube extending lengthwise thereof from a point near its inlet end to its delivery end and surrounded by an oil chamber; a nozzle centrally disposed in the inlet end of said tube with its discharge end distantly removed from the discharge end of the tube; means for admitting oil from said chamber through the walls of said nozzle into the interior thereof at points midway of its length; means for admitting air under pressure to the top of said oil chamber from the inlet end of the casing; and means for controlling the amount of air admitted.

19. The combination of a casing open at opposite ends and provided with an air tube extending lengthwise thereof and surrounded by an oil chamber; a nozzle in the inlet end of said tube; means for admitting oil from said chamber through the walls of said nozzle into the interior thereof; means for admitting air under pressure to the top of said oil chamber; means controlling the amount of air admitted; and means for regulating the admission of oil to said nozzle.

Signed by me at 746 Old South Bldg., Boston, Mass., this 4th day of May, 1926.

CHARLES A. CLAFLIN.